United States Patent
Reeves et al.

(10) Patent No.: US 7,571,238 B1
(45) Date of Patent: Aug. 4, 2009

(54) AUTHORIZING COMMUNICATION SERVICES

(75) Inventors: Douglas S. Reeves, Raleigh, NC (US); Samuel H. Christie, IV, Cary, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 2138 days.

(21) Appl. No.: 09/691,347

(22) Filed: Oct. 18, 2000

(51) Int. Cl.
*G06F 15/16* (2006.01)

(52) U.S. Cl. .................. 709/229; 713/201; 370/468; 370/390

(58) Field of Classification Search .............. 713/201; 370/468, 338, 328, 390; 709/229
See application file for complete search history.

(56) References Cited

U.S. PATENT DOCUMENTS

| | | | | |
|---|---|---|---|---|
| 6,058,113 A | * | 5/2000 | Chang | 370/390 |
| 6,310,859 B1 | * | 10/2001 | Morita et al. | 370/235 |
| 6,654,363 B1 | * | 11/2003 | Li et al. | 370/338 |
| 6,661,806 B1 | * | 12/2003 | Eriksson et al. | 370/468 |
| 6,680,922 B1 | * | 1/2004 | Jorgensen | 370/328 |

\* cited by examiner

*Primary Examiner*—Tonia L Dollinger
*Assistant Examiner*—Kyung H Shin
(74) *Attorney, Agent, or Firm*—Withrow & Terronova, P.L.L.C.

(57) ABSTRACT

The present invention provides for a communication server of a service provider to authorize resource reservation for a communication over a packet-switched network without requiring the communication server to know the identity of or significant details about the network elements providing the communication. The communication server is configured to provide secure authorization indicia to the terminal receiving or delivering information for the communication. The terminal presents the authorization indicia to one or more network elements involved in reserving resources for the communication. The network element or elements will use the authorization indicia to authorize resource reservation for the communication, and may forward the authentication to additional network elements involved in reserving resources for the communication.

28 Claims, 7 Drawing Sheets

AUTHORIZING COMMUNICATION SERVICES

FIELD OF THE INVENTION

The present invention relates generally to authorizing communication services, and particularly, to using special authentication to arrange for such services over a network.

BACKGROUND OF THE INVENTION

In the conventional public switched telephone network (PSTN), there is a close association between elements that carry voice traffic and elements that manage telephony services, such as call setup and teardown. This close association is not just a result of technical advantages, but also a result of telecommunications policy, which for many years allowed telephone services to be run as a regulated monopoly. One desirable outcome of this close association is that call management elements can easily monitor and directly control the state of the switches and links that carry voice traffic.

In the future, telephony services will be provided in a more open and dynamic fashion. In the emerging network model, control of voice services and transport of voice data are independent functions that may be provided by two or more independent service providers. The independence of voice service and data transport raises the question of how to allow a service provider, which offers call services, to directly control the network of the business that offers the data transport. The owner of the network that transports voice will likely be unwilling to give direct control to the call service provider, and may even be unwilling to reveal to the call service provider the details of the network topology, capacity, and current status, among many other factors bearing on the availability and quality of communication services.

The above situation is further complicated for end-to-end voice transmission as well as real-time transfer of audio and video, because multiple networks may be traversed to deliver the data. Each of these networks may be independently operated. Further, multiple service providers, such as long distance providers and cable companies, may be involved as well. As such, there is a need for an effective way for a service provider to authorize the use of resources in data transport networks without knowing who will process the authorization.

A couple of solutions have been proposed; unfortunately, each proposal is less than desirable. The first proposal was provided by the Packet Cable Consortium and related telephone services over cable networks. The Packet Cable Consortium proposed a model in which a telephony call server directly communicates its authorization of resource reservation to each of the devices that implement that reservation. The assumption behind these standards is that there is only one provider, which provides both the voice transport and the call services. As discussed above, such a technique will likely be ineffective in the emerging network model containing independent service and network providers.

In a document recently presented to the Internet Task Force (ITF) standards body, the Packet Cable Consortium proposed a different model acknowledging the possibility of multiple network and service providers. However, if the model still operated under the assumption that the call service elements know how to directly communicate with and control the elements in the transport networks that are responsible for resource reservation. Again, this limiting assumption does not fit the open environment of the emerging communication network model. Thus, there remains a need for an effective way to authorize the use of resources without requiring the network provider to directly communicate with the service provider to reserve resources throughout the network to initiate authorization.

SUMMARY OF THE INVENTION

The present invention provides for a communication server of a service provider to authorize resource reservation for a communication session over a packet-switched network without requiring the communication server to know the identity of or significant details about the network elements providing the communication. The communication server is configured to provide secure authorization indicia to the terminal receiving or delivering information for the communication. The terminal presents the authorization indicia to one or more network elements involved in reserving resources for the communication. The network element or elements will use the authorization indicia to authorize resource reservation for the communication, and may forward the authentication to additional network elements involved in reserving resources for the communication.

Preferably, the authorization indicia are sent to the origination and destination terminals for the communication. Each terminal may use the authorization indicia to initiate reservation of resources from network elements at opposite ends of a communication path facilitating the communication. The network elements will use the authorization indicia to complete provisioning of resources with any intermediate network elements.

Any of the network elements may use the authorization indicia to access a policy server to gain approval for reservation of the resources. The communication may provide transfer of data for any type of media, including voice, audio and video, where it is necessary to reserve sufficient bandwidth, quality of service, or like resource. The communication may be uni-directional or bi-directional to allow for all types of communications, from bi-directional voice and data applications to uni-directional downloading or streaming.

Those skilled in the art will appreciate the scope of the present invention and realize additional aspects thereof after reading the following detailed description of the preferred embodiments of the invention in association with the accompanying drawing figures.

BRIEF DESCRIPTION OF THE DRAWINGS FIGURES

Reference will now be made in detail to the preferred embodiments of the present invention, examples of which are illustrated in the accompanying drawings, wherein like numerals indicate the same elements throughout the several views.

DETAILED DESCRIPTION OF THE PREFERRED EMBODIMENTS

The present invention allows a communication service provider to authorize communications over a network without directly communicating with each and every element in the network. Preferably, the communication server will provide authentication information or indicia to a terminal initiating or receiving communications. The terminal or terminals will send the authorization indicia to the network elements, wherein the authorization indicia are sufficient to enable the various network elements requiring authorization to authorize the communication.

The invention is particularly applicable to audio, video, voice and like telephony communications over packet-switched networks, such as the Internet and its supporting networks. Although the preferred embodiment of the invention is described below identifying specific protocols and software technologies, those skilled in the art will recognize numerous protocols and related technologies that exist, and that will be developed, that are capable of carrying out the inventive concept described herein. Given the varying scope and application of the present invention, a brief overview of an IP network structure is provided in light of several exemplary communication systems. The brief overview is followed by a detailed description of the operation of a preferred embodiment of the present invention.

Figure 1:
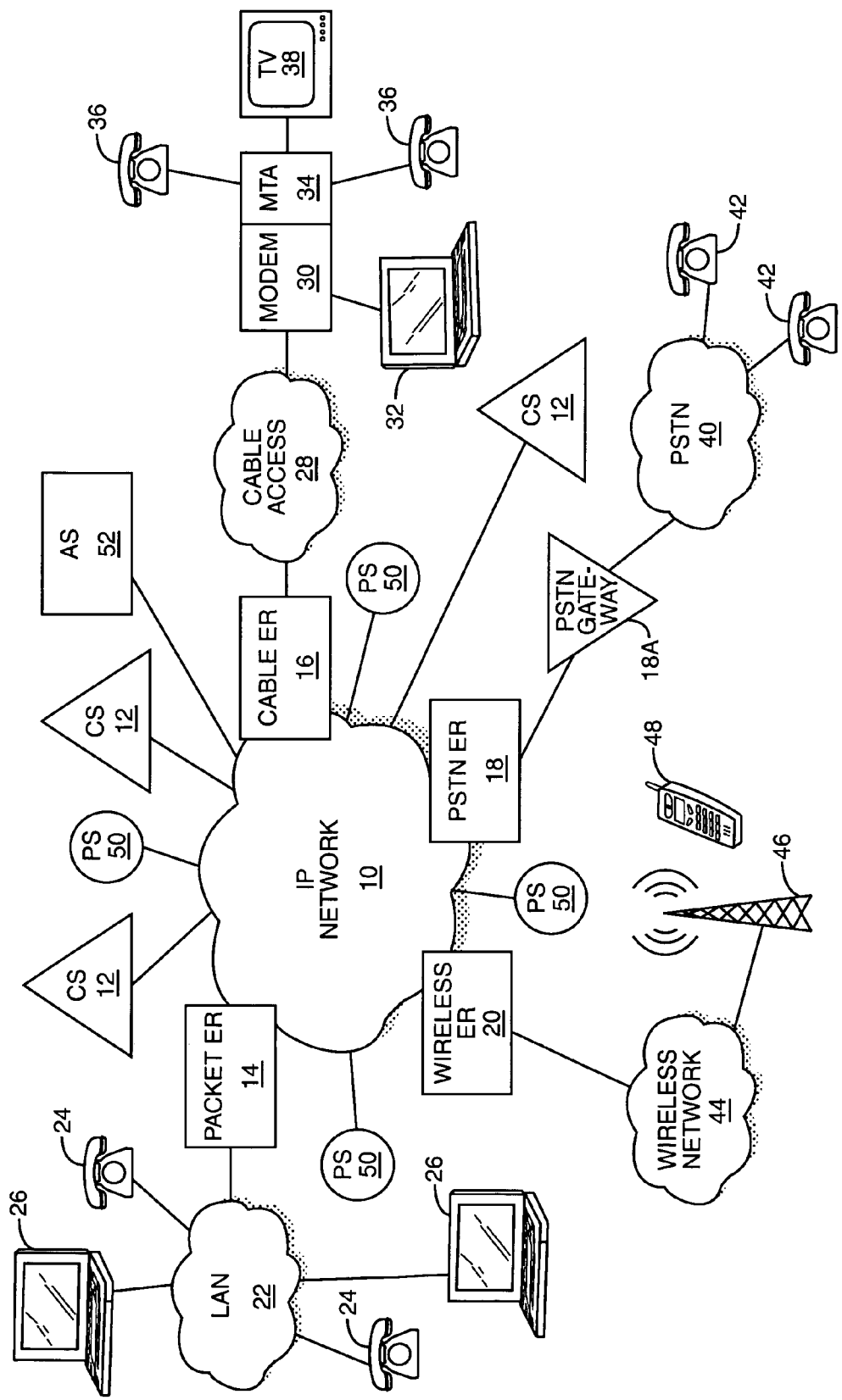
FIG. 1 is a representation of a network depicting numerous elements in networks capable of incorporating and using the concepts of the present invention.

FIG. 1 is illustrative of the numerous communication systems and networks that will benefit from the present invention. Those skilled in the art should recognize that those networks and technologies illustrated are merely exemplary and not intended to be limiting. At the heart of the network is the packet-switched Internet Protocol (IP) network 10, or like network that is capable of interacting with numerous devices and additional networks. A communication server 12, such as a telephony call server or other communication control system used by a service provider to control communications over the various networks, is used to control communications.

A series of edge routers, such as a traditional packet edge router 14, cable edge router 16, PSTN edge router 18, and wireless edge router 20, facilitate communications between the IP network 10 and other communication networks. The traditional packet edge router 14 may interact with another network, such as a local area network (LAN) 22, to facilitate communications with any number of internet telephony devices 24 and computers 26. The cable edge router 16 will operatively connect the IP network 10 to a cable access network 28, which connects cable users via cable modems 30 or media terminal adaptors 34. Preferably, computers 32 may connect directly to a cable modem 30, whereas telephony devices 36 or traditional televisions or cable boxes 38 may interact with the media terminal adaptor 34.

The PSTN edge router 18 is preferably configured to connect the packet-switched IP network 10 to the traditionally circuit-switched network of the PSTN 40 via a gateway 18A. The PSTN 40 will provide communications with telephony devices 42 in traditional fashion. The wireless edge router 20 will preferably provide communications between the IP network 10 and the wireless communications network 44 to facilitate communications over the respective networks. Typically, the wireless network 44 will interact with base stations 46 to facilitate wireless communications with mobile terminals, such as wireless personal digital assistants and mobile telephones 48.

Those skilled in the art will recognize that the term "edge router" is used in conjunction with the edge routers 14, 16, 18 and 20, and represents the various types of policy enforcement points sufficient to manage communications between various technologies and networks over the IP network 10. These edge routers may take on many different configurations, such as media gateways. Further, additional routers may be necessary throughout the IP network 10 to facilitate end-to-end routing between commercial domains.

In operation, uni-directional or bi-directional communications are established between one or more of the various telephony devices, computers and the like and are effected over the IP network 10 as authorized by one or more of the communication servers 12. The communication servers 12 are effectively in charge of providing the communication service, wherein access providers or operators of the IP network 10 and related elements, such as the edge routers 14, 16, 18, and 20, provide the infrastructure for the communication service. The elements of the IP network 10 may need to contact one or more policy servers 50 or other policy decision points to facilitate communications over the network and between two or more edge routers 14-20. In essence, the policy servers 50 determine whether the requested communication is acceptable. In addition to the various communication networks, network infrastructures and service providers, the present invention also cooperates with an authentication service 52 that is capable of authenticating a communication authorization. The authentication may use various types of certificates and encryption, such as those used in the secure sockets layer (SSL) protocol currently used in connection with electronic banking and commerce.

Figure 2:
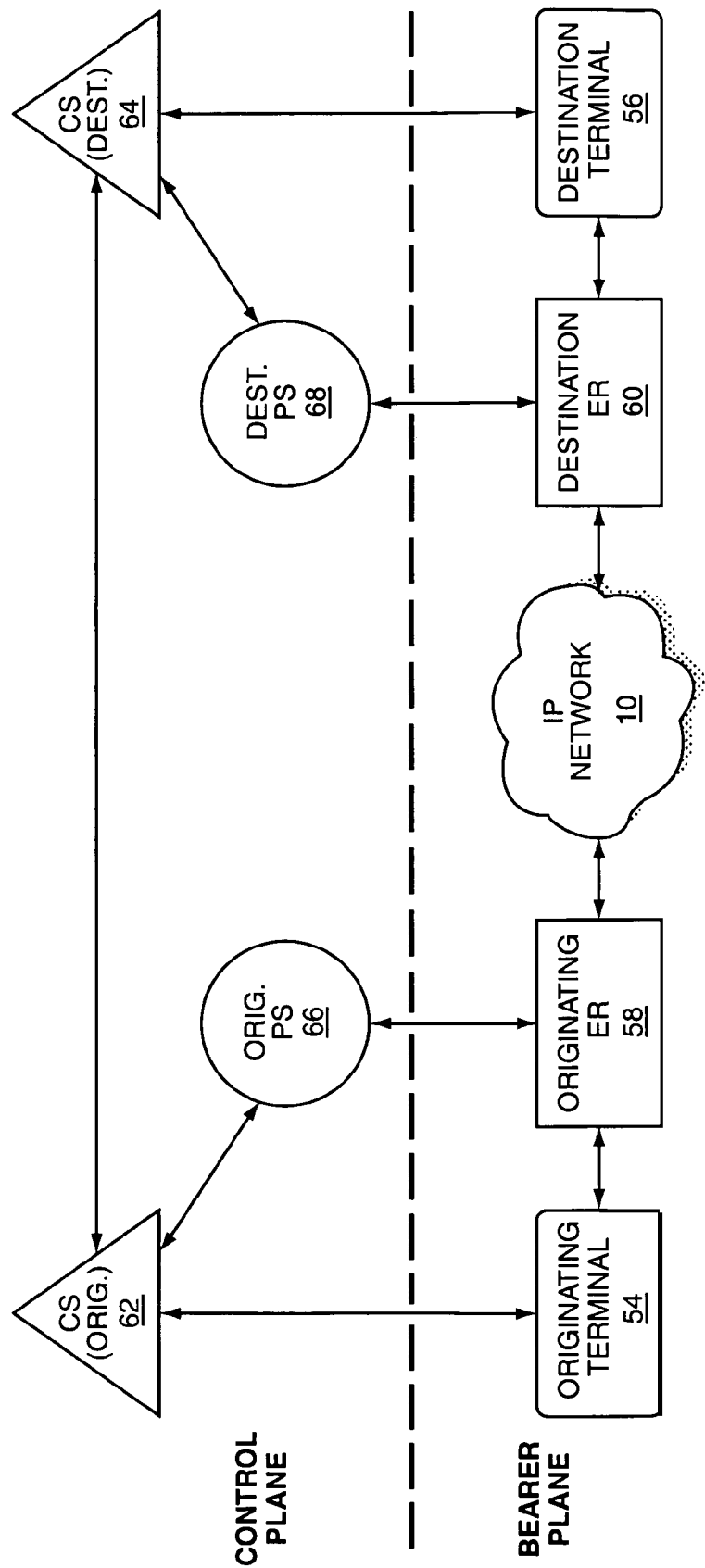
FIG. 2 is a simplified block representation of various network elements and their relationships with one another according to the present invention.

The application is best understood in association with FIG. 2, wherein many of the elements shown in FIG. 1 are generically depicted and associated with new reference numbers to facilitate a clear and concise description of the invention. FIG. 2 assumes that communications are being established between an originating terminal 54 and a destination terminal 56. The originating and destination terminals 54 and 56 may be any of the telephony devices, computers or like devices depicted and described in association with FIG. 1. The originating terminal 54 will be configured to communicate with an originating edge router 58 over a network to gain access to the IP network 10. Likewise, the destination terminal 56 will communicate with the destination edge route 60 over a network to gain access to the IP network 10. Similarly, the originating and destination edge routers 58 and 60 are analogous to any of the edge routers 14-20 described in FIG. 1.

An originating call server 62 is associated with the originating terminal 54, and a destination communication server 64 is associated with the destination terminal 56. The communication servers 62 and 64 will preferably communicate over a packet-switched network with the respective originating and destination terminals 54, 56. The originating and destination edge routers 58, 60 will communicate over packet-switched networks with originating and destination policy servers 66, 68, respectively.

Figure 3:
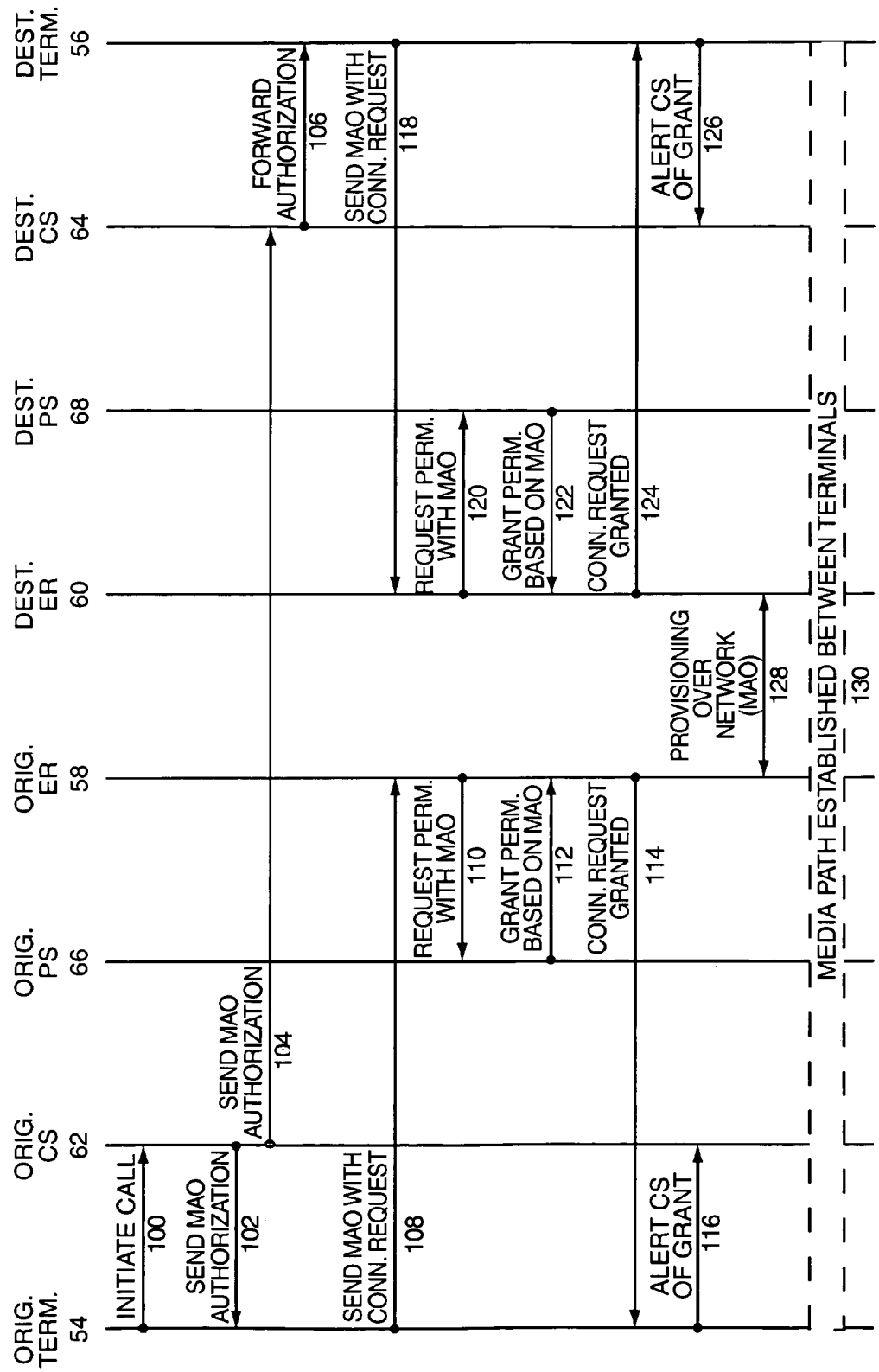
FIG. 3 is a simplified flow diagram for establishing a communication path between two terminals according to the present invention.

Prior to facilitating communications, a user of the originating and destination terminals 54 and 56 will subscribe to network access from some network service provider. The network service provider provides the basic access to the IP network 10 through the corresponding originating or destination edge router 58, 60. The user will also subscribe to communication services, such as telephony services, from a communication service provider. The basic flow of call setup and reservation is provided in FIG. 3. Assuming that a telephony communication is desired, when the originating user attempts to make a telephone call, the originating communication server 62 of the communication service provider is contacted by the originating terminal 54 (block 100).

The originating communication server 62 will verify that the calling user is a valid subscriber, and determine that the originating user subscribes to the requested service. The originating communication server 62 will then authorize the requested service, if appropriate, by issuing authorization indicia information or like information. This authorization indicia will preferably contain the identity of the originating user, the identity of the communication service provider, and the resources the originating user is authorized to receive. The indicia may also contain the communication server address and a correlation tag. The correlation tag is useful to correlate the access provider with the service provider. Such a correlation is very useful to facilitate billing between the access network and service provider as well as the user of the service. The authorization indicia is preferably time-stamped and digitally signed according to the authentication protocol provided by the authentication server 52. The time-stamped and signed authorization information will be referred to as a "media authorization object" (MAO).

Importantly, the authorization procedure may allow the authentication server 52 to send authentication indicia to establish the MAO at the originating communication server 62 or originating terminal 54. The network elements can then process the MAO in addition to the request for resources to determine if the request is authorized. The various terminals, communication servers and network elements may incorporate any number of public and private key encryption technologies or authentication protocols to facilitate authorization without requiring the communication servers 62, 64 to have undue access to or unnecessary information about the network elements.

The originating communication server 62 preferably sends the MAO to the originating terminal 54 (block 102) as well as to the destination communication server 64 (block 104). The destination communication server 64 will forward the authorization to the destination terminal 56 (block 106). The originating terminal 54 and the destination terminal 56 will then attempt to establish a communication connection between them and reserve sufficient resources for the communication. In this case, a telephony connection, such as a voice connection, is established. To effect the communication connection, the originating and destination terminals 54 and 56 will embed the MAO provided by the originating communication server 62 to the necessary network elements responsible for reserving resources for the communication connection. These requests, along with the MAO, will be propagated through the network to facilitate the communication connection.

As depicted in FIG. 2, these network elements are represented by the originating and destination edge routers 58 and 60. As such, the originating terminal 54 will send the MAO embedded in the communication request to the originating edge router 58 (block 108). The originating edge router 58 will extract the MAO from the request and request permission to establish the connection and resources from the associated, originating policy server 66 (block 110). The originating policy server 66, assuming the connection is authorized, will grant permission based on the MAO and other traditional criteria for the originating edge router 58 to establish the connection (block 112). The policy servers 66, 68 may contact the respective communication server to confirm or aid the authorization process. The originating edge router 58 will inform the originating terminal 54 that the connection request was granted (block 114). The originating terminal 54 will alert the originating communication server 62 of the grant (block 116).

Concurrently at the opposite end of the network, the destination terminal 56 will send the connection request with the MAO embedded therein to the destination edge router 60 (block 118). The destination edge router 60 will request permission to establish the connection using the extracted MAO from the associated, destination policy server 68 (block 120). The destination policy server 68 will grant permission based on the MAO to the destination edge router 60 (block 122). The destination edge router 60 will alert the destination terminal 56 that the connection request was granted (block 124), wherein the destination terminal 56 will alert the destination communication server 64 of the grant (block 126).

At this point, the originating terminal 54 has been authorized a connection to the originating edge router 58 and the destination terminal 56 has been authorized a connection to the destination edge router 60, based on the MAO. All that is left to finalize the communication is to effect a connection with sufficient resources between the originating edge router 58 and the destination edge router 60. To accomplish connection between the originating and destination edge routers 58, 60, provisioning over the network is effected using the MAO for authorization (block 128). This provisioning is effected by propagating the MAO with the connection request throughout the network and to any network elements that require authorization, prior to providing service.

As such, any network elements that are responsible for reserving resources will receive a request and the MAO. The network elements will be able to interpret the MAO, verify that it was recently issued by the communications service provider for a specific communication service, and determine that the authorization information has not been tampered with by unauthorized parties. The elements will simply forward a request with the MAO to the "next-hop" in the communication path until provisioning is complete. Once the provisioning is finalized, a communication or media path is established between the terminals 54, 56 (block 130).

Establishing a communication path as described above eliminates the need for the communication service providers to understand the configuration and directly communicate with access providers to authorize communication services. Providing authorization using the MAO or like indicia, an authenticated authorization may be propagated through the network to establish a communication path in an efficient manner without requiring the communication service providers to have unnecessary information about the access provider, and vice versa.

The above describes the overall concept of using an authenticated object to establish communications along a set path without requiring the communication server 12 to interact with and directly authorize the individual routing and switching devices facilitating the communication path. To fully disclose the best mode and provide an enabling disclosure, the following is a detailed outline of a call flow using session initiation protocol (SIP) to initiate the communications; resource reservation protocol (RSVP) for reservation of resources for the communication; and the common open policy service (COPS) protocol for providing policy-based admission control over requests for network resources. Although these protocols are used in the preferred embodiment, those skilled in the art will recognize various alternative protocols capable of implementing the concepts of the present invention.

Figure 4A:
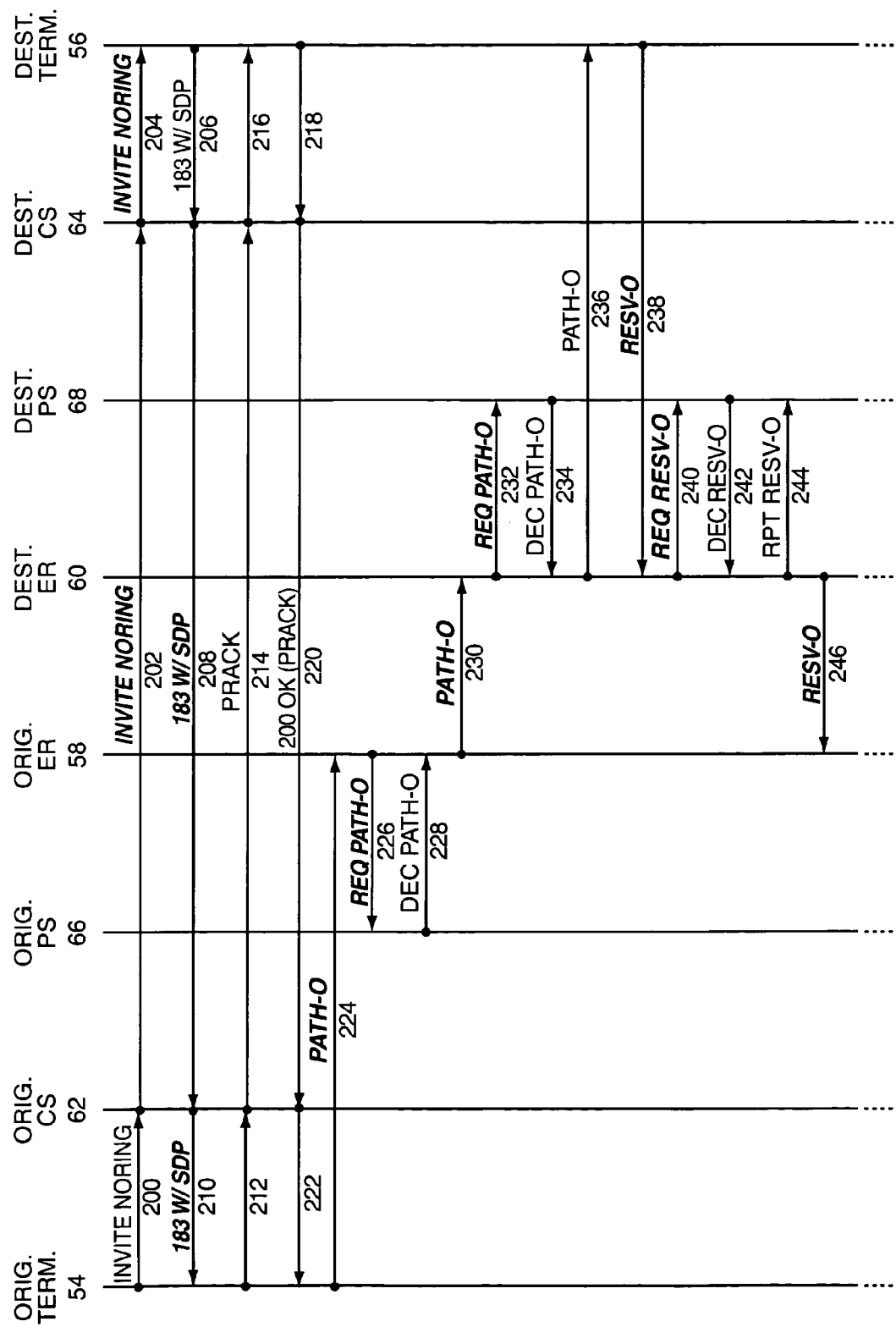
FIGS. 4A, 4B and 4C represent a preferred procedure for establishing a communication session using the session initiation protocol, RSVP messaging and COPS messaging according to the preferred embodiment of the present invention.
Figure 4B:
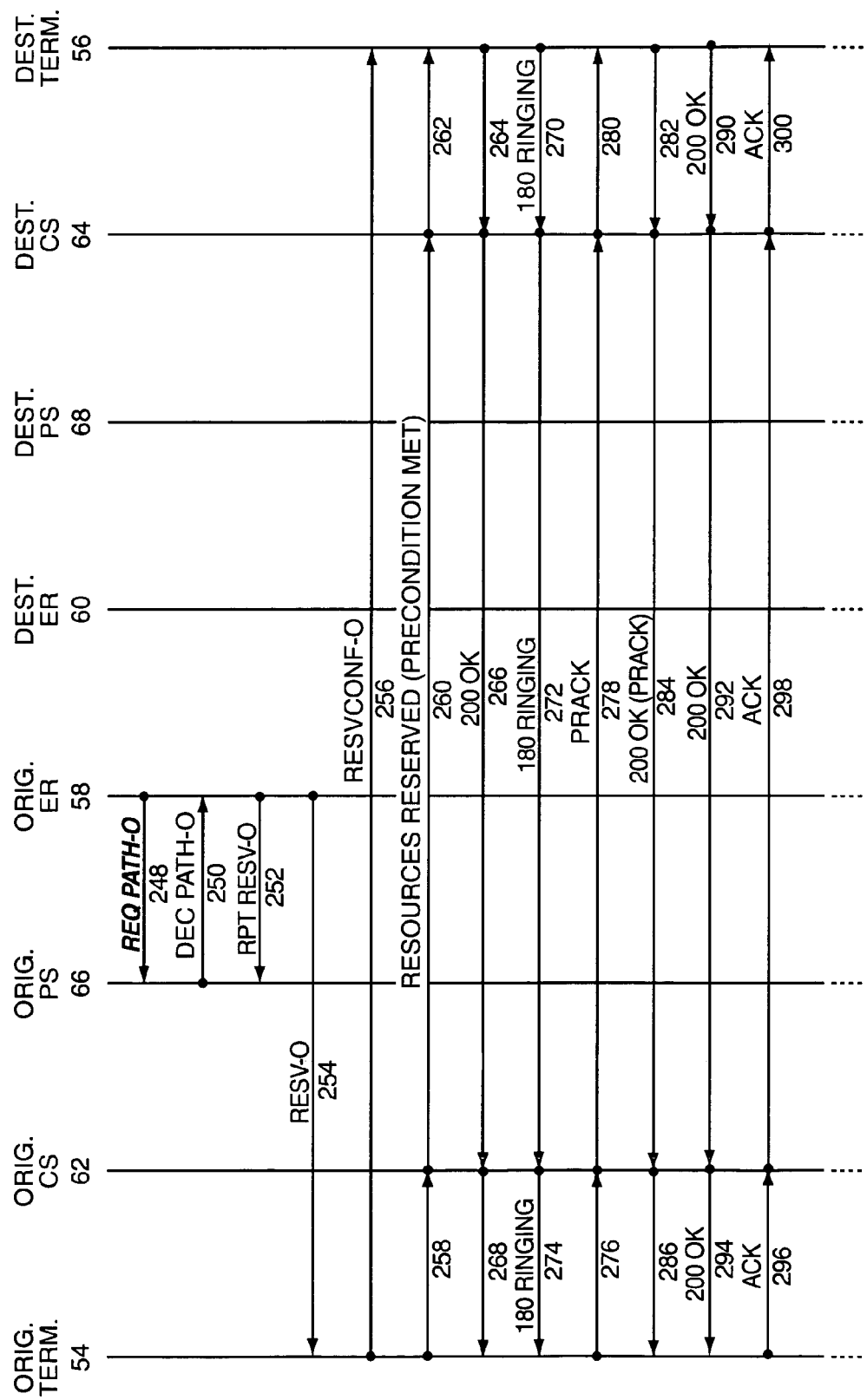
Figure 4C:
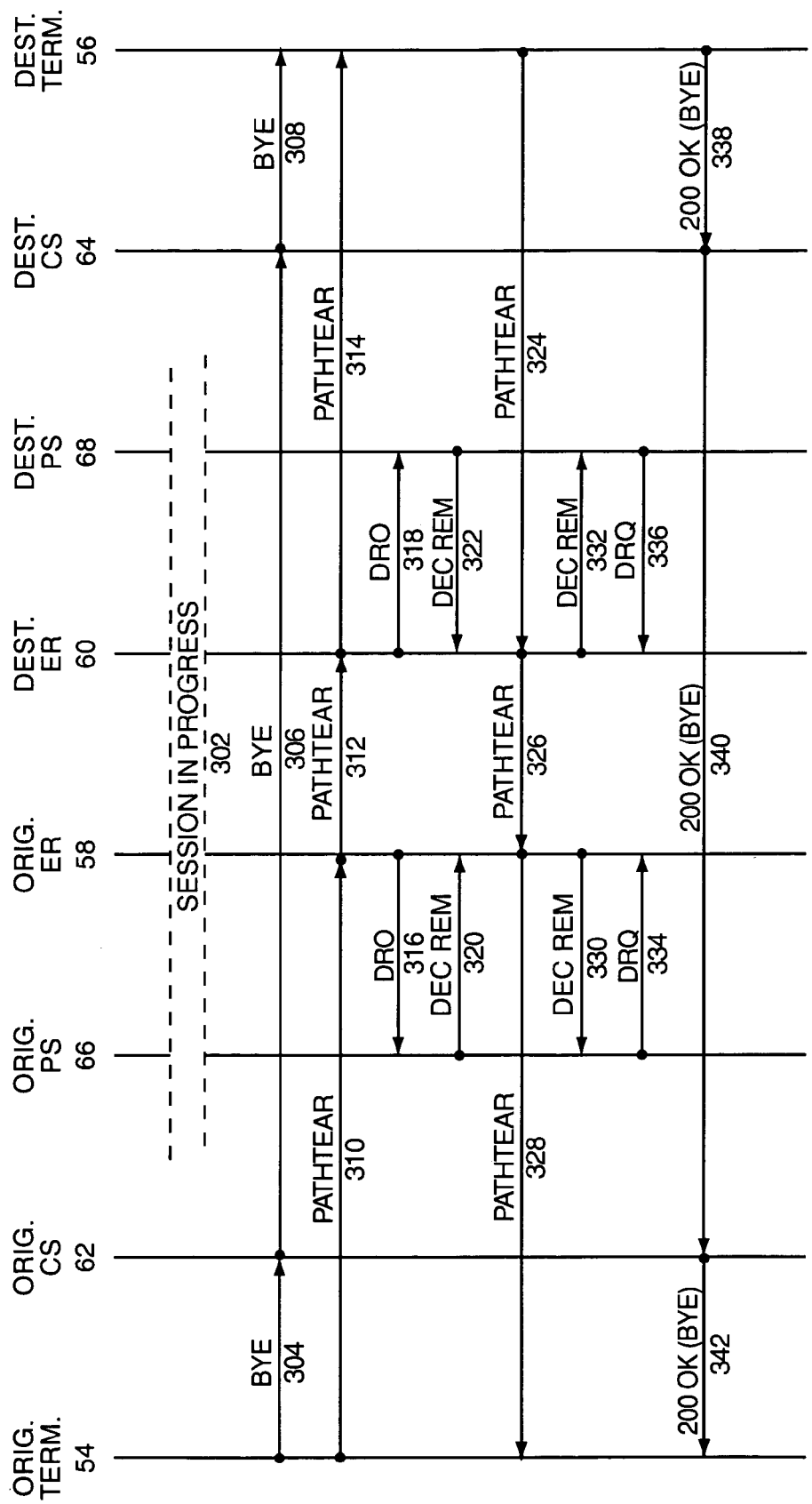

As alluded to above, when initiating a communication requiring a reservation of resources to ensure proper quality of service and sufficient bandwidth, it is often necessary to establish a connection between the parties and then reserve the necessary resources. Again, a telephony application is used as an example to facilitate an understanding of the invention. FIGS. 4A, 4B, and 4C depict a call flow diagram of a basic end-point-to-end-point call flow.

Assuming that the originating and destination terminals 54, 56 are telephony devices, the originating terminal 54 will collect dialed digits and send an initial SIP INVITE message to the originating communication server 62 when a user goes off hook and dials a telephone number (block 200). The initial INVITE message contains a SIP header to indicate the IP address of the destination terminal 56 to be used for subsequent end-to-end SIP signaling exchanges. The originating call server 62 acts as a SIP proxy. The originating communication server 62, acting as the SIP proxy, checks a subscriber database to authenticate the user's identification and ability to receive, and be billed for, the requested service.

If successful, the communication server 62, continuing to act as the SIP proxy, forwards the invitation to the intended destination terminal 56 (block 202) via the destination call server 64. As part of the forwarded invitation, the SIP proxy appends the MAO for authorizing the service and the resources necessary to provide the service. As part of the MAO, the SIP proxy preferably includes its own identity, and authenticates the information contained therein. The messaging in italics and bold in FIGS. 4A, 4B and 4C represents those messages including the MAO.

En route to the destination terminal 56, the invitation is sent to the destination communication server 64, also acting as a SIP proxy, which receives the invitation and forwards it to the destination terminal 56 along with the MAO (block 204). Preferably, the INVITE message is a "no ring (NORING)" invitation, which directs the destination terminal 56 to initiate the connection without immediately alerting the user of the destination terminal 56. The destination user is not alerted at this point because the resource reservations required for the communication have not been made.

The destination terminal 56 will presumably respond favorably with a SIP session response message "183" describing its preferences. The session response is initially sent to the destination communication server 64, which continues to act as a SIP proxy (block 206). Notably, the session response is forwarded to the originating terminal 54 via the originating communication server 62 (blocks 208 and 210). Either the SIP destination user agent at the destination terminal 56 or the destination communication server 64 can append the MAO message to the session response that is ultimately sent to the originating terminal 54. At this point, both the originating and destination terminals 54, 56 have the MAO information. Preferably, the session response uses the session description protocol (SDP) to describe the capabilities and media types supported by the originating and destination terminals 54, 56. Essentially, SDP messages list the features that must be implemented at the endpoints.

For conformance with other exemplary call flows, FIG. 4A depicts the originating terminal 54 forwarding a SIP PRACK message to the destination terminal through the originating and destination communication servers 62, 64 (blocks 212, 214 and 216). The destination terminal 56 will respond with a SIP 200 OK (PRACK) message to the originating terminal 54 via the destination and originating communication servers 64, 62 (blocks 218, 220 and 222). Once the SIP messaging has been exchanged between the originating and destination terminals 54, 56, each terminal has sufficient information regarding the other endpoint, bandwidth and other characteristics of the media exchange to facilitate a communication. At this point, the endpoints, which are the originating and destination terminals 54, 56, need to act to reserve the necessary resources for the media stream facilitating communications.

RSVP is the preferred reservation setup and control protocol for streaming, media communications or other applications that may require circuit-switched emulation on an IP network 10. Typically, senders of information define outgoing traffic for the communication in terms of the upper and lower bounds of bandwidth, delay and jitter. RSVP transmits PATH messages containing the traffic specification information to the destination address of the destination terminal 56. Each RSVP-enabled device within the IP network 10, such as the originating and destination edge routers 58, 60, will establish a "PATH-state" that includes the previous source address of the PATH message to define each of the next-hop addresses between the originating and destination terminals 54, 56.

To set up the communication path, the originating terminal 54 will send a first PATH message, which includes the MAO, to the originating edge router 58 (block 224). The originating edge router 58 forwards the request, with the MAO, to its associated, originating policy server 66 using COPS (block 226). The originating policy server 66 will verify that the requested services are authorized using the MAO, and assuming the requested is authorized, the policy server will provide the favorable decision to the originating edge router 58 (block 228). The originating edge router 58 will then forward the PATH message to the next hop in the IP network (block 230). Assuming the next hop is the destination edge router 60, the destination edge router will request the destination policy server 68 to authorize the requested services (block 232). The request to the destination policy server 68 includes the MAO and uses COPS. Assuming the destination policy server 68 responds favorably to the request, the decision is provided to the destination edge router 60 (block 234), which forwards the PATH message directly to the destination terminal 56 (block 236).

At this point, the connection information between the two endpoints has been established using SIP and the path has been defined using the PATH message. To actually reserve resources, the receiving terminal, which is the destination terminal 56, sends a reservation request message (RESV) along the path to the source of the PATH message, the originating terminal 54. The RESV message will preferably include the traffic specification, quality of service (QoS) level required and any other information necessary for reservation, such as the transport protocol and application port numbers. Although optional, the MAO may be provided with the RESV messaging as propagated from the destination terminal 56 to the originating terminal 54.

The RESV message traverses the network from the destination terminal 56 to the originating terminal 54 in an analogous fashion to the way the PATH message was sent from the originating terminal 54 to the destination terminal 56. As such, the RESV message is sent from the destination terminal 56 to the destination edge router 60 (block 238), which requests the reservation from the destination policy server 68 (block 240). Assuming the request is accepted, the destination policy server 68 sends the decision back to the destination edge router 60 (block 242), which may report the reservation back to the destination policy server 68 for confirmation of the reservation (block 244). The destination edge router 60 will then forward the RESV message to the next hop in the network (block 246).

Referring now to FIG. 4B and again assuming the next hop is the originating edge router 58, the RESV message is sent from there to the originating policy server 66 (block 248), which returns the decision to the originating edge router 58 (block 250). The originating edge router 58 will also report the reservation back to the originating policy server 66 using COPS (block 252) and send the RESV message to the originating terminal 54 (block 254). When an RSVP-enabled edge router, such as the originating and destination edge routers 58, 60, receives an RESV message, the edge router uses an admission control process to authorize the request and allocate the necessary resources. If the request is not satisfied do to lack of resources or an authorization failure, the edge router will return an error back to the destination terminal 56. If accepted, the edge router sends the RESV upstream to the next edge router along the path towards the originating terminal 54.

Once the originating terminal 54 receives the RESV message, it will return a reservation confirmation message (RESVCONF) back to the destination terminal 56 to complete the handshake to alert the destination terminal of a successful reservation along the entire path (block 256). At this point, a uni-directional communication path has been established for media flows from the originating terminal 54 to the destination terminal 56. A communication path is established only for delivery of media from the originating 54 to the destination terminal 56. If bi-directional communications are necessary, a separate path using RSVP must be established in the same fashion as above, from the destination terminal 56 to the originating terminal 54. To effect this, steps 218-256 are repeated in reverse order to establish a communication and reserve resources for data flow from the destination terminal 56 to the originating terminal 54.

At this point, sufficient resources have been reserved, and the originating terminal 54 sends a SIP message, indicating the resources have been reserved and all pre-conditions have been met, to the destination terminal 56 via the originating and destination communication servers 62 and 64 (blocks 258, 260 and 262). Again, the originating and destination communication servers 62, 64 act as SIP proxies for SIP messaging. The destination terminal 56 will send a 200 OK to the originating terminal 54 via the destination and originating communication servers 62, 64 (blocks 264, 266 and 268).

Assuming bi-directional communications have been arranged and that two paths were set up, one from the originating terminal 54 to the destination terminal 56 and one from the destination terminal 56 to the originating terminal 54, the destination user is alerted that a call has been received, by a method such as providing a windows notification or ringing the telephony device. Concurrently, the destination terminal 56 sends a SIP ringing message (180 RINGING) to the originating terminal 54 via the destination and originating communication servers 64, 62 (blocks 270, 272 and 274). The originating terminal 54 may optionally acknowledge the 180 RINGING message by sending a PRACK message (blocks 276, 278 and 280) to the destination terminal 56, which will respond with a 200 OK to the originating terminal 54 (blocks 282, 284 and 286).

Assuming that the destination user picks up the telephony device or answers the call in some fashion, the destination terminal 56 will send a 200 OK to the originating terminal 54 indicating that the destination user has accepted the call (blocks 290, 292 and 294). The originating terminal 54 will acknowledge the 200 OK message with an ACK message to the destination terminal 56 (blocks 296, 298 and 300). At this point, a communications session is facilitated (block 302) as depicted in FIG. 4C.

The communication session will continue until one of the users terminates the call or communication using a SIP BYE message. Assuming the originating user terminates the communication, the originating terminal 54 will send a BYE message to the destination terminal 56 via the originating and destination communication servers 62, 64 (blocks 304, 306 and 308). RSVP is used to tear down the communication path or paths. In a similar fashion to the path setup and reservation, the originating terminal 54 will send a teardown message (PATHTEAR) message to the originating edge router 58 (block 310), which will forward the PATHTEAR message over the network to the destination edge router 60 (block 312). The destination edge router 60 will forward the PATHTEAR message on to the destination terminal 56 (block 314). The originating and destination edge routers 58, 60 will send corresponding messages to the associated originating and destination policy servers 66, 68, respectively (blocks 316 and 318). The originating and destination policy servers 66, 68 will alert the corresponding originating and destination edge routers 58, 60 to remove the resource reservations (blocks 320 and 322).

Assuming a bi-directional telephony call, the path from the destination terminal 56 to the originating terminal 54 must also be torn down in a similar fashion using RSVP. A PATHTEAR message is sent from the destination terminal 56 to the originating terminal 54 via the destination and originating edge routers 60, 58 (blocks 324, 326 and 328). Notably, any other routing or like devices between the originating and destination edge routers 58, 60 that require reservation of resources will receive the teardown messaging. The originating and destination edge routers 58, 60 will alert the originating and destination policy servers 66, 68 of the teardown request (blocks 330 and 332). The originating and destination policy servers 66, 68 will return authorization to recommit the reserve resources to the originating and destination edge routers 58, 60 (blocks 334 and 336). At this point, the RSVP messaging is complete and a final SIP message from the destination terminal 56 to the originating terminal 54 is sent as a 200 OK in response to the BYE message initiated by the originating terminal 54. The 200 OK is sent from the destination terminal 56 to the originating terminal 54 via the destination communication server 64 and the originating communication server 62 (blocks 338, 340 and 342). Although SIP is the preferred call signaling protocol, those skilled in the art will quickly recognize that other call signaling protocols such as H.323, H.248, or the like may be applicable.

It is important to recognize when reviewing the above disclosure that the present invention is applicable in any number of uni-directional or bi-directional communications. The invention has applications for providing uni-directional audio and video from an originating terminal to a destination terminal. In such a case, the originating terminal may be a streaming audio/video server. The server may be associated with a movie studio, cable company or television network. Likewise, bi-directional communications may facilitate telephony exchanges between two or more parties engaged in a telephone call wherein a portion of the call is sent over a packet-switched network, such as the IP network 10. The various routers and network elements using the authorization indicia for access and reservation of resources may use the authorization indicia in various ways.

As discussed above, the network elements may access policy servers or like systems to check out or approve authorization. The various elements may have the policy making decision incorporated therein. As an example, the originating or destination edge routers may be configured to have policy-making capability and may not need to gain approval from a separate policy server or system. The switching and routing devices, such as the edge routers in a cable system, may be the cable modem termination system (CMTS). Those skilled in the art will recognize that the concepts of the present invention are applicable to various networking technologies, including Asynchronous Transfer Mode (ATM) networks. In an ATM environment, a MAO or like object may be used in a set-up message for establishing a switched virtual circuit.

Figure 5:
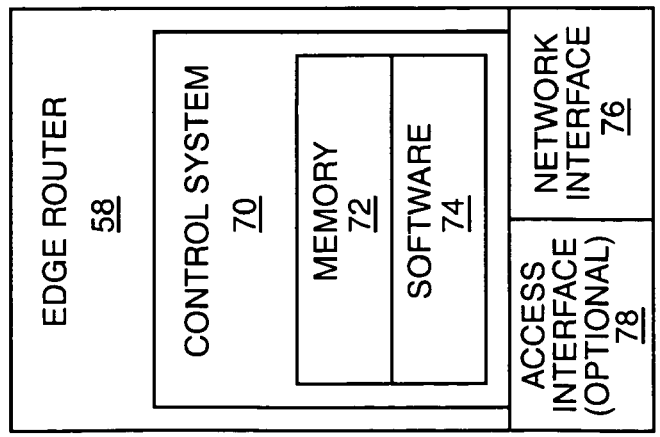
FIG. 5 is a block representation of an edge router according to the present invention.

FIG. 5 is a simplified, block representation of an edge router, such as the originating edge router 58. The edge router 58 will preferably have a control system 70 associated with memory 72 having the requisite software 74 for operation. The control system 70 will control a network interface 76 and an optional access interface 78. Preferably, the network interface 76 is a traditional packet-switched network for communicating with any local area network facilitating communications with the IP network 10. The access interface 78 may be any type of interface necessary to facilitate communications with the associated communication network. For example, the access interface may be a TDM interface for handling PSTN traffic, or may be a CMTS interface for a cable system. Those skilled in the art will recognize the various types of interfaces and the necessary configuration of the control system to allow operation of any particular interface.

Figure 6:
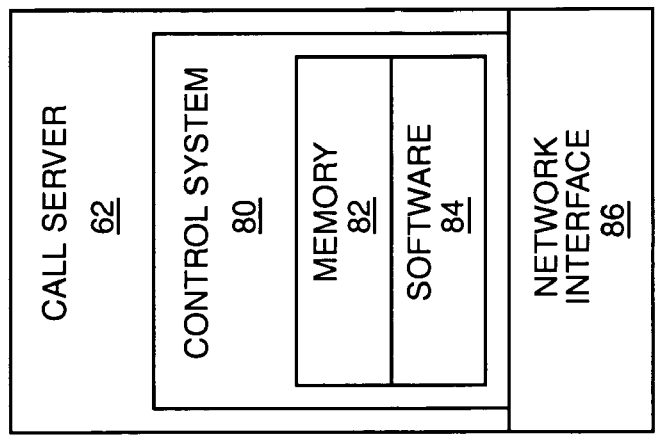
FIG. 6 is a block representation of a call server according to the present invention.

FIG. 6 depicts a call server, such as the originating call server 62. The call server 62 may include a control system 80 associated with memory 82 having the necessary software 84 to facilitate operation. The call server 62 will include a network interface 86 to facilitate communications over the IP network 10 or other packet-switched network.

Figure 7:
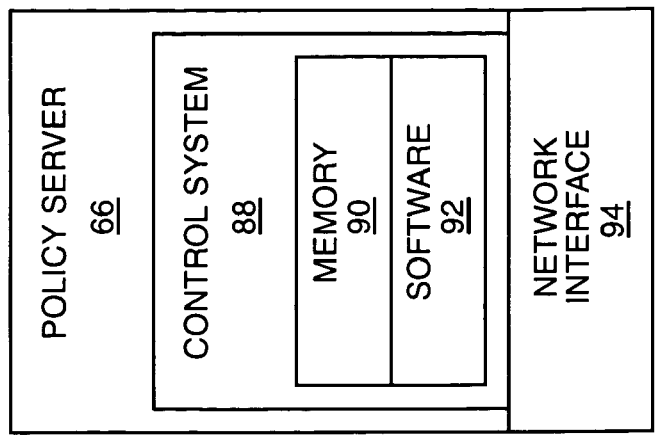
FIG. 7 is a block representation of a policy server according to the present invention.

The policy servers, such as the policy server 66, will also include a control system 88, memory 90 and the requisite software 92 for operation as shown in FIG. 7. A network interface 94 for communications over the IP network 10 or like packet-switched network is also provided.

Those skilled in the art will recognize various modifications of and improvements to the concepts of the present invention. These modifications are considered within the scope of the disclosure and the claims that follow.

What is claimed is:

1. A method of authorizing communications comprising:
   a) receiving a request for authorization to establish a communication with a destination terminal from an originating terminal;
   b) generating authorization indicia for the communication, the authorization indicia configured to enable reservation of resources for the communication; and
   c) initially sending the authorization indicia to at least one of the originating and destination terminals to facilitate reservation of resources for the communication, wherein the at least one of the originating and destination terminals receiving the authorization indicia will subsequently send the authorization indicia to at least one network element to reserve resources for at least a portion of the communication.

2. The method of claim 1 wherein the sending step comprises sending the authorization indicia to the originating and destination terminals to facilitate reservation of resources for the communication, wherein the originating and destination terminals receiving the authorization indicia will send the authorization to corresponding network elements forming part of the communication path to reserve resources for portions of the communication.

3. The method of claim 1 further comprising verifying the user of the originating terminal is capable of receiving services providing the communication.

4. The method of claim 1 wherein the step of generating authorization indicia comprises authenticating the authorization indicia for use by the at least one network element.

5. A method of authorizing communications comprising:
   a) receiving a request from a destination terminal to reserve resources for a communication between an originating terminal and the destination terminal, the request including authorization indicia provided to the originating terminal by a service provider and configured to enable reservation of resources for the communication; and
   b) reserving resources for at least a portion of the communication based on the authorization indicia.

6. The method of claim 5 wherein the reserving step comprises reserving resources for the communication at a second network element associated with the destination terminal using the request received from the destination terminal.

7. The method of claim 6 further comprising provisioning for resources for the communication over a network between the first and second network elements based on the authorization indicia.

8. The method of claim 5 further comprising establishing a second communication from the originating terminal to the destination terminal and reserving resources for at least a portion of the second communication based on the authorization indicia.

9. A terminal for effecting communications comprising a network interface and a control system associated with said network interface, said control system adapted to:
   a) send a request to establish a communication with a remote terminal over a network to a service provider;
   b) receive authorization indicia configured to enable reservation of resources for the communication from the communication server in response to the request to establish the communication; and
   c) send a request associated with the authorization indicia to a network element to reserve resources for the communication wherein the authorization indicia is configured to enable the network element to reserve sufficient resources for at least a portion of the communication.

10. The terminal of claim 9 wherein said control system is further adapted to effect the communication over a communication path having the reserved resources with the destination terminal via the network element.

11. The terminal of claim 10 wherein said control system is adapted to effect a second communication over a second communication path with the destination terminal via the network element.

12. The terminal of claim 9 wherein said terminal is a cable terminal and said control system facilitates at least one of the group consisting of receiving or transmitting audio and video via the communication.

13. The terminal of claim 9 wherein said terminal is a telephony terminal and said control system facilitates at least one of the group consisting of receiving or transmitting audio via the communication.

14. The terminal of claim 9 wherein said terminal is a receiver and said control system facilitates at least one of the group consisting of receiving at least one of the group consisting of audio and video via the communication.

15. A communication server for facilitating communications, said communication server comprising a network interface and a control system adapted to:

a) receive a request for authorization to establish a communication with a destination terminal from an origination terminal;
b) generate authorization indicia for the communication, the authorization indicia configured to enable reservation of resources for the communication; and
c) initially send the authorization indicia to at least one of the originating and destination terminals to facilitate reservation of resources for the communication, wherein the at least one of the originating and destination terminals receiving the authorization indicia will subsequently send the authorization indicia to at least one network element to reserve resources for at least a portion of the communication.

16. The communication server of claim 15 wherein said control system is further adapted to send the authorization indicia to the originating and destination terminals to facilitate reservation of resources for the communication, wherein the originating and destination terminals receiving the authorization indicia will send the authorization to corresponding network elements forming part of the communication path to reserve resources for portions of the communication.

17. The communication server of claim 15 wherein said control system is further adapted to verify the user of the originating terminal is capable of receiving services providing the communication.

18. The system of claim 15 wherein said control system is further adapted to authenticate the authorization indicia for use by the at least one network element.

19. A policy server for approving resource reservation for a router in a network, said policy server comprising a network interface and a control system associated with said network interface said control system adapted to:
a) receive a request to approve reservation of resources for a communication from a router, the request including authorization indicia configured to enable reservation of resources for the communication;
b) determine whether to approve the reservation of resources for the communication based on the authorization indicia; and
c) send a response to the request to the router indicating whether the request for the reservation of resources was approved.

20. The policy server of claim 19 wherein said control system is further adapted to communicate with a service provider to confirm the reservation of resources is appropriate based on the authorization indicia.

21. The policy server of claim 19 wherein said control system is further adapted to communicate with an authentication service to confirm the authorization indicia is authentic.

22. A computer readable medium comprising software for instructing a computer to:

a) send a request to establish a communication with a remote terminal over a network to a service provider;
b) receive authorization indicia configured to enable reservation of resources for the communication from the communication server in response to the request to establish the communication; and
c) send a request associated with the authorization indicia to a network element to reserve resources for the communication wherein the authorization indicia is configured to enable the network element to reserve sufficient resources for at least a portion of the communication.

23. The computer readable medium of claim 22 comprising further instructions to effect the communication over a communication path having the reserved resources with the destination terminal via the network element.

24. The computer readable media of 23 comprising further instructions to effect a second communication over a second communication path with the destination terminal via the network element.

25. A computer readable medium comprising software for instructing a computer to:
a) receive a request for authorization to establish a communication with a destination terminal from an origination terminal;
b) generate authorization indicia for the communication, the authorization indicia configured to enable reservation of resources for the communication; and
c) initially send the authorization indicia to at least one of the originating and destination terminals to facilitate reservation of resources for the communication, wherein the at least one of the originating and destination terminals receiving the authorization indicia will subsequently send the authorization indicia to at least one network element to reserve resources for at least a portion of the communication.

26. The computer readable medium of claim 25 comprising further instructions to send the authorization indicia to the originating and destination terminals to facilitate reservation of resources for the communication, wherein the originating and destination terminals receiving the authorization indicia will send the authorization to corresponding network elements forming part of the communication path to reserve resources for portions of the communication.

27. The computer readable medium of claim 25 comprising further instructions to verify the user of the originating terminal is capable of receiving services providing the communication.

28. The computer readable medium of claim 25 comprising further instructions to authenticate the authorization indicia for use by the at least one network element.

* * * * *